(12) United States Patent
Michiels et al.

(10) Patent No.: US 9,380,033 B2
(45) Date of Patent: Jun. 28, 2016

(54) IMPLEMENTING USE-DEPENDENT SECURITY SETTINGS IN A SINGLE WHITE-BOX IMPLEMENTATION

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 38 days.

(21) Appl. No.: 14/263,247

(22) Filed: Apr. 28, 2014

(65) Prior Publication Data

US 2015/0312224 A1   Oct. 29, 2015

(51) Int. Cl.
*H04L 29/06* (2006.01)
*H04L 9/00* (2006.01)

(52) U.S. Cl.
CPC ............ *H04L 63/0428* (2013.01); *H04L 9/002* (2013.01)

(58) Field of Classification Search
None
See application file for complete search history.

(56) References Cited

U.S. PATENT DOCUMENTS

| | | |
|---|---|---|
| 2007/0014394 A1 | 1/2007 | Harder et al. |
| 2008/0005806 A1* | 1/2008 | Alve .............................. 726/30 |
| 2009/0089884 A1* | 4/2009 | Watson et al. ................... 726/28 |
| 2009/0158051 A1 | 6/2009 | Michiels |
| 2011/0040964 A1* | 2/2011 | Nussbaum et al. ............ 713/155 |
| 2012/0163582 A1* | 6/2012 | Lee et al. .......................... 380/28 |
| 2014/0101458 A1* | 4/2014 | Farrugia et al. ................ 713/190 |

OTHER PUBLICATIONS

"Syncrosoft MCFACT—Secure Data Processing Technology", Retrust Sixth Quarterly Meeting, Mar. 11, 2008, Villach, Austria, 108 pages.
Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.
Extended European Search Report for EP 15165316 mailed Sep. 25, 2015.

* cited by examiner

*Primary Examiner* — David Pearson

(57) ABSTRACT

A method of enforcing security settings in a cryptographic system, including: receiving, by the cryptographic system, a first input message associated with a first security setting of a plurality of security settings; performing, by the cryptographic system, a keyed cryptographic operation mapping the first input message into a first output message, wherein the keyed cryptographic operation produces a correct output message when the cryptographic system is authorized for the first security setting, wherein each of the plurality of security settings has an associated set of input messages wherein the sets of input messages do not overlap.

39 Claims, 3 Drawing Sheets

IMPLEMENTING USE-DEPENDENT SECURITY SETTINGS IN A SINGLE WHITE-BOX IMPLEMENTATION

TECHNICAL FIELD

Various exemplary embodiments disclosed herein relate generally to implementing use-dependent security settings in a single white-box implementation.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a white-box system for enforcing security settings, the non-transitory machine-readable storage medium including: instructions for receiving, by the white-box system, a first input message associated with a first security setting of a plurality of security settings; instructions for performing, by the white-box system, a keyed cryptographic operation mapping the first input message into a first output message, wherein the keyed cryptographic operation produces a correct output message when the white-box system is authorized for the first security setting, wherein each of the plurality of security settings has an associated set of input messages wherein the sets of input messages do not overlap.

Various embodiments are described wherein each message in a set of input messages includes the value of the associated security setting.

Various embodiments are described further including: instructions for determining a system identifier for the white-box system; and instructions for combining the system identifier with the first output message, wherein when the white-box system is authorized to perform the keyed cryptographic function, the correct output message is produced.

Various embodiments are described wherein combining the system identifier with the first output message includes XORing system identifier with a portion of the output message.

Various embodiments are described wherein in the system identifier is a hardware identifier of the white-box system.

Various embodiments are described wherein in the system identifier is a software identifier of software on white-box system.

Various embodiments are described further including: instructions for receiving a second input message with second security setting; and instructions for performing, by the white-box system, a keyed cryptographic operation mapping the second input message into a second output message, wherein the keyed cryptographic operation produces a correct output message when the white-box system is authorized for the second security setting.

Various embodiments are described further including: instructions for receiving a second input message with second security setting; and instructions for performing, by the white-box system, a keyed cryptographic operation mapping the second input message into a second output message, wherein the keyed cryptographic operation produces an incorrect output message when the white-box system is not authorized for the second security setting.

Various embodiments are described wherein the white-box system includes a network of lookup tables.

Various embodiments are described further including: instructions for determining a system identifier for the white-box system; and instructions for accessing a missing entry in one lookup table in the network of lookup tables and outputting a value from the lookup table dependent on the system identifier wherein when the white-box system is authorized to perform the keyed cryptographic function, the correct output message is produced.

Various embodiments are described further including: instructions for determining a system identifier for the white-box system; and instructions for producing the correct output message when the correct system identifier has been received.

Various embodiments are described wherein the white-box system includes a network of finite state machines.

Various embodiments are described wherein the cryptographic operation is one of advanced encryption system (AES) or data encryption standard (DES).

Further, various exemplary embodiments relate to a method of producing a white-box implementation of a cryptographic operation mapping an input message to an output message, wherein the white-box implementation enforces security settings, including: producing a white-box implementation of the cryptographic operation; receiving information identifying the security settings to be applied by the white-box implementation, wherein each identified security setting has an associated set of input messages wherein the sets of input messages do not overlap; modifying the white-box implementation based upon the received information identifying the security settings so that: when a received input message is associated with one of the received security settings, the white-box implementation outputs a correct output message associated with the received input message.

Various embodiments are described wherein each message in a set of input messages includes the value of the associated security setting.

Various embodiments are described wherein when a received input message is not associated with one of the received security settings, the white-box implementation outputs an incorrect output message associated with the received input message Various embodiments are described wherein modifying the white-box implementation further includes: determining a system identifier associated a first security setting; and modifying a portion of the white-box implementation associated with only input messages associated with the first security setting.

Various embodiments are described wherein modifying a portion the white-box implementation further includes; modifying the output messages of the cryptographic implementation resulting from input messages associated with the first security setting by the system identifier; modifying the cryptographic implementation to receive during operation a system identifier of a cryptographic system implementing the cryptographic implementation; and modifying the cryptographic implementation to combine during operation the received system identifier with the output message of the cryptographic implementation.

Various embodiments are described wherein in the system identifier is a hardware identifier of the cryptographic system.

Various embodiments are described wherein in the system identifier is a software identifier of software on cryptographic system.

Various embodiments are described wherein the cryptographic implementation includes a network of lookup tables.

Various embodiments are described wherein modifying a portion the cryptographic implementation further includes; modifying the cryptographic implementation to receive during operation a system identifier of a cryptographic system implementing the cryptographic implementation; modifying a first lookup table of the plurality of lookup tables, by eliminating an entry of the first lookup table; modifying the cryptographic implementation to output a value from the first lookup table dependent on the system identifier when an input to the lookup table accesses the eliminated entry in the first table so that when the cryptographic system is authorized to perform the keyed cryptographic function, the correct output message.

Various embodiments are described wherein modifying the cryptographic implementation further includes: determining a system identifier associated a first security setting; and modifying a portion of a lookup table producing a portion of the output message associated with only input messages associated with the first security setting by XORing the system identifier with a portion of the row of the lookup table producing a portion of the output message; modifying the cryptographic implementation to receive during operation a system identifier of a cryptographic system implementing the cryptographic implementation; and modifying the cryptographic implementation to combine during operation the received system identifier with the output message of the cryptographic implementation.

Various embodiments are described wherein in the system identifier is a hardware identifier of the cryptographic system.

Various embodiments are described wherein in the system identifier is a software identifier of software on cryptographic system.

Various embodiments are described wherein the cryptographic system includes a network of finite state machines.

Further, various exemplary embodiments relate to a method of enforcing security settings in a cryptographic system, including: receiving, by the cryptographic system, a first input message associated with a first security setting of a plurality of security settings; performing, by the cryptographic system, a keyed cryptographic operation mapping the first input message into a first output message, wherein the keyed cryptographic operation produces a correct output message when the cryptographic system is authorized for the first security setting, wherein each of the plurality of security settings has an associated set of input messages wherein the sets of input messages do not overlap.

Various embodiments are described wherein each message in a set of input messages includes the value of the associated security setting.

Various embodiments are described further including: determining a system identifier for the cryptographic system; and combining the system identifier with the first output message, wherein when the cryptographic system is authorized to perform the keyed cryptographic function, the correct output message is produced.

Various embodiments are described wherein combining the system identifier with the first output message includes XORing system identifier with a portion of the output message.

Various embodiments are described wherein in the system identifier is a hardware identifier of the cryptographic system.

Various embodiments are described wherein in the system identifier is a software identifier of software on cryptographic system.

Various embodiments are described further including: receiving a second input message with second security setting; and performing, by the cryptographic system, a keyed cryptographic operation mapping the second input message into a second output message, wherein the keyed cryptographic operation produces a correct output message when the cryptographic system is authorized for the second security setting.

Various embodiments are described further including: receiving a second input message with second security setting; and performing, by the cryptographic system, a keyed cryptographic operation mapping the second input message into a second output message, wherein the keyed cryptographic operation produces an incorrect output message when the cryptographic system is not authorized for the second security setting.

Various embodiments are described wherein the cryptographic system includes a network of lookup tables.

Various embodiments are described further including: determining a system identifier for the cryptographic system; and accessing a missing entry in one lookup table in the network of lookup tables and outputting a value from the lookup table dependent on the system identifier wherein when the cryptographic system is authorized to perform the keyed cryptographic function, the correct output message is produced.

Various embodiments are described further including: determining a system identifier for the cryptographic system; and producing the correct output message when the correct system identifier has been received.

Various embodiments are described wherein the cryptographic system includes a network of finite state machines.

Various embodiments are described wherein the cryptographic operation is one of advanced encryption system (AES) or data encryption standard (DES).

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
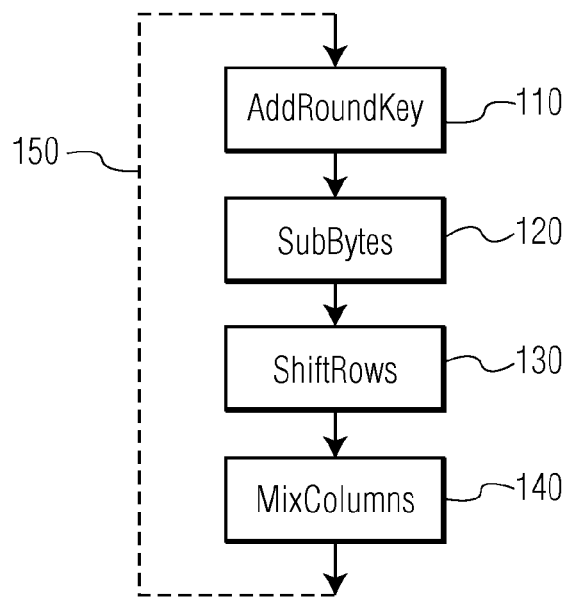
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

The discussion below is directed to white-box cryptography because it is the most challenging attack model. Further, many cryptographic implementations are deployed and used in an environment where they are subject to a white-box attack. There is also a black-box attack model and a grey-box attack model. In the black-box attack model, it is assumed that the attacker only has access to the input and output of the implementation. In the grey-box attack model, it is assumed, that in addition the access to the input and the output of the implementation, that the attacker has access to side channel information regarding the execution of the implementation. Such side channel information may include power, timing, electronic emissions, etc. Accordingly, the benefits of the embodiments described below may be used to prevent any of these various levels of attack as well as others that may be defined. Therefore, where white-box implementations are described, it is intended that they may include black-box implementations as well as grey-box implementations that use the various methods described in the embodiments below.

In order to keep the number of cryptographic keys in a system small, it may be desirable to use the same key for different applications. This may mean that the same key may be used with different security settings. The embodiments below show how this can be done if we implement the cryptographic algorithm by a white-box implementation.

Cryptographic keys play an important role in the security of many systems. They are, for instance, used for authentication, integrity checking, and ensuring the confidentiality of data. In such systems it is essential to hide the cryptographic keys. If an adversary is able to extract a key, this compromises the security.

White-box cryptography is the discipline of implementing a cryptographic algorithm in software such that it is difficult for an attacker to find the key. Hereby, we assume the strongest conceivable (but for software most realistic) attack model in which the adversary is assumed to have full control over and full access to the white-box implementation.

Accordingly, it is desirable keep the number of cryptographic keys in a networked system small. This is not only true because of memory requirements, but also to simplify the key handling and to prevent the need for multiple encryptions of the same data. Hence, preferably the same key may be used for different applications and for different users. However, the difficulty of this is that different applications may have different security needs and that different users may have different authorization rights. For instance, for some security-sensitive applications it may be desirable that the use of a key is bounded to a specific device (e.g., for banking services), while for other less security-sensitive applications it may be more desirable that a user is able to copy it to all his devices (e.g., for loyalty cards). Another example is a conditional access system for digital television, where not all users may access the same content. If a cryptographic algorithm is implemented in a conventional way, different security settings cannot be realized for different uses of the same key.

The embodiments described below show how white-box implementations may be used to realize different security goals for different uses of the same key. This may be done by dividing the message space into multiple groups of messages, where a specific security setting may be associated with a group of messages. In one embodiment, this approach works by letting a message choose its security setting via the choice of the proper padding.

Features of embodiments described below that provide different security settings in a white-box implementation are now described. In the message space (e.g., $2^{128}$ 128-bit messages in AES) k subsets $M_1, M_2, \ldots, M_k$ with k≥2 may be identified. A cryptographic algorithm may be implemented by a white-box implementation WB. Let WB(m) be the part of the white-box implementation that is used for message m. Similarly, $WB(M_i)$ may be defined as the part of the white-box implementation that is used for the messages from $M_i$, i.e., $WB(M_i) = \cup_{m \in M_i} WB(m)$. Accordingly, for any i,j with i≠j, it holds that if the white-box implementation is run on messages from $M_i$, then it uses a part of the white-box implementation that is not used for any of the messages from $M_j$ and/or vice versa, i.e.

$$\delta_{i,j} = WB(M_i) \Delta WB(M_j) \neq \emptyset,$$

where $A\Delta B = (A-B) \cup (B-A)$ denotes the symmetric difference between sets A and B. The part $\delta_{i,j}$ of the white-box implementation is used to implement security measurements that are unique for $M_i$ over $M_j$ and vice versa. Examples of security properties that may be different between different instances of the white-box implementation include: bindings to the platform; integrity checking of software; access control to certain material (e.g., the implementation works correctly for $M_i$ thus allowing access to $M_i$, but not for $M_j$ thus denying access to $M_j$); and preventing copying of white-box implementation (code lifting). This last property may always present because if $WB(M_i) - WB(M_j) \neq \emptyset$ and $WB(M_j) - WB(M_i) \neq \emptyset$, then having the specific white-box implementation for $M_j$ (or $M_i$) does not directly give the white-box implementation of $M_i$ (or $M_j$).

The white-box implementation providing use-dependent security settings may offer k possible security settings. To operate in the $i^{th}$ security setting, messages from $M_i$ are provided to the white-box implementation. It is noted that when it is stated that messages from $M_i$ are provided to the white-box implementation that this includes the white-box implementation receiving the messages from $M_i$ as either cleartext or ciphertext. This means that by choosing the padding in the messages a security setting is chosen.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. In other embodiments, the key may include dynamic keys that, for example, take implicit key information and combine it with some sort of dynamic information to produce the key used in the cryptographic function. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function.

FIG. 1 illustrates some main processing steps of a round of AES. The processing steps include:

AddRoundKey 110—each byte of the state is XORed with a byte of the round key;
SubBytes 120—a byte-to-byte permutation using a lookup table;
ShiftRows 140—each row of the state is rotated a fixed number of bytes; and
MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
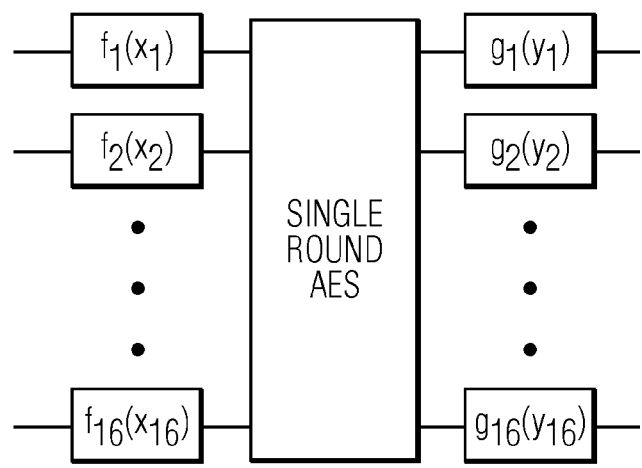
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots, x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function for input byte $x_{i,j}$ as $T_{i,j}(x_{i,j})=S(x_{i,j}\oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}$, $y_{2,j}$, $y_{3,j}$, and $y_{4,j}$ via the algebraic expression $z_{l,j}=MC_{l,1}\cdot y_{1,j}\oplus MC_{l,2}\cdot y_{2,j}\oplus MC_{l,3}\cdot y_{3,j}\oplus MC_{l,4}\cdot y_{4,j}$ in $GF(2^8)$ for some constants $MC_{l,r}$.

Now define a lookup table for each byte-to-byte function $Q_{i,j,l}(x_{i,j})=MC_{l,i}\cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j})\oplus Q_{2,j,l}(x_{2,j})\oplus Q_{3,j,l}(x_{3,j})\oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
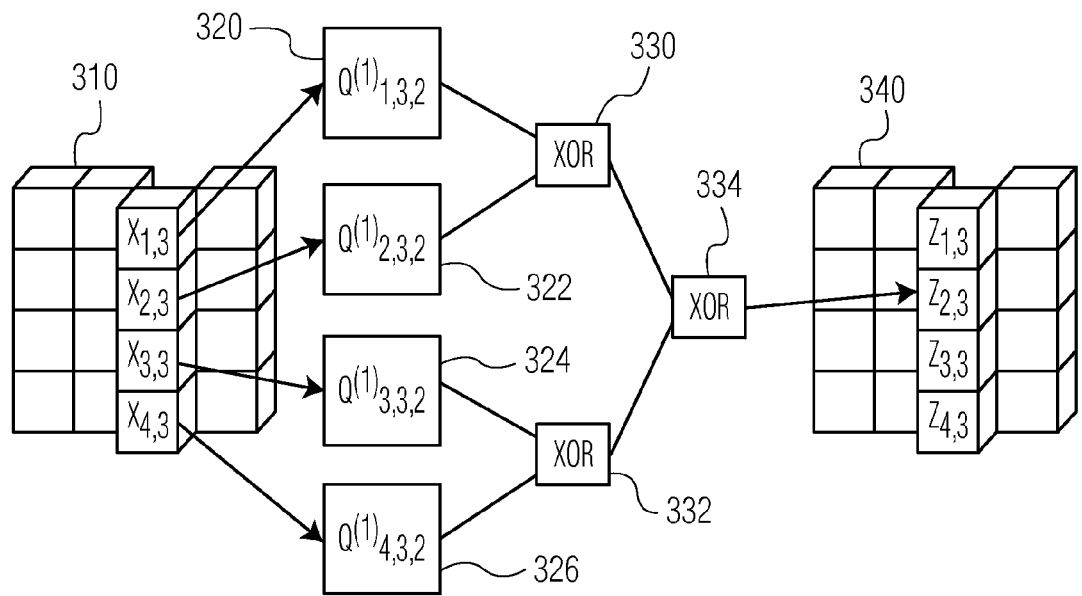
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}$, $x_{2,3}$, $x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
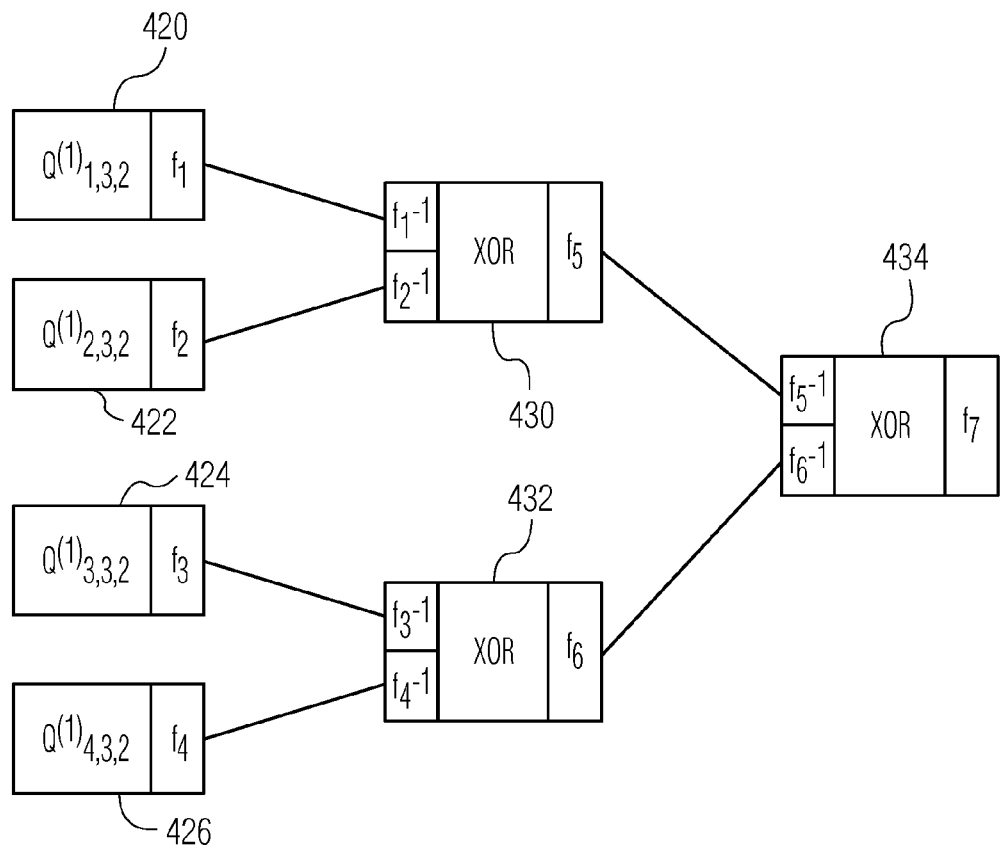
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

The description of the table lookup based white-box implementation described above was for the encryption operation of AES. It is noted that the above description is easily adapted for the encryption operation by using the inverse of the Sub-Bytes, ShiftRows, and MixColumns operations (invSubBytes, invShiftRow, and invMixColumns). Accordingly, it is assumed that the description above can be used for either the encryption or decryption operation of AES as needed in the embodiments below.

The embodiments implementing use-dependent security settings in a white-box implementation may be described in two parts. In the first part, a white-box implementation is discussed with the property that k sets of messages $M_i$ exist, such that for any i,j with i≠j it holds that if the white-box implementation is run on messages from $M_i$, then it uses a part of the white-box implementation that is not used for any of the messages from $M_j$. In the second part, it is shown how to modify this white-box implementation such that different security settings for different sets $M_i$ result.

First Part: White-Box Implementation

AES will be used in this embodiment. As described above, AES operates on data blocks of 16 bytes. These are written as a 4×4 byte matrix, called the state.

The last round of AES only consists of an input-encoded 8-to-8 bit lookup table for each of the 16 bytes of the input-state. These 16 lookup tables merge the operations invAddRoundKey, invSubBytes, and invAddRoundKey. More formally, this means the following, where for ease of presentation the invShiftRows operation of the last round is ignored as this is simply a renumbering of the indices. Let for each byte $x_{i,j}$ of the state the byte-to-byte function $T_{i,j}$ be defined by $T_{i,j}(x_{i,j})=k_{i,j}^{11}\oplus S(x_{i,j}\oplus k_{i,j}^{10})$. Then, the last round of the white-box implementation of Chow 1 contains 16 byte-to-byte lookup tables that implement the function $T_{i,j}\circ f_{i,j}^{-1}$, where $f_{i,j}$ is a randomly chosen bijective function. The function $f_{i,j}$ is added to encode the input of $T_{i,j}$. Input and output encodings are put on lookup tables in such a way that the output encoding of one table matches the input encoding assumed in the next tables.

Now define the k=16 message sets $M_1, M_2, \ldots, M_k$, such that $M_i$ with i=1, 2, . . . , 16 is the set of plaintext messages for which the last nibble gives the binary representation of the value i. Note that each set consists of $2^{124}$ messages. This results in the desired property that for any i,j with i≠j it holds that if the white-box implementation is run on messages from $M_i$, then it uses a part of the white-box implementation that is not used for any of the messages from $M_j$. After all, for messages from $M_i$ the lookup table $T_{4,4}\circ f_{4,4}^{-1}$ for the last byte of the computed 16-byte result is only accessed for those rows that end with the binary representation of the value i.

Second Part: Realizing Different Security Settings

Now, for example, define the following 16 security settings where each security setting is individually addressable. In this example, each of the 16 security settings are specified as the last nibble of the output message as described above.

Seven security settings (k=1, . . . , 7), each binding the implementation to a different nibble $s_i$ with i=1, . . . , 7, where the nibble $s_i$ is derivable from the platform and identifies the platform on which the white-box implementation should run on. This realizes platform binding.

Seven security settings (k=8, . . . , 14), each checking the integrity of a different software programs $S_i$ with i=1, . . . , 7. Such integrity checking may include verifying a hash $H_i$ of the software instance (or a portion thereof) being used.

One security setting (k=15) that denies access to the content. This may be achieved by the unauthorized white-box software providing an incorrect answer for messages with this security setting.

One security setting (k=16) in which no special security properties are enforced. This allows the white-box implementation to correctly process messages with this setting.

Any given white-box implementation may only correctly operate for one of these security settings or any combination of them as needed. For example, where settings are to give access to specific channels in a cable or satellite TV system, the white-box implementation may be able to only correctly access messages related to channels that the user has permission to view. Also, for channels that are part of a basic package available to all, they may be messages with the security coding of k=16 as described above that allows all of these messages to be processed.

These security settings may be implemented, for example, in the following way.

There are $2^4$ rows r in lookup table $T_{4,4} \circ f_{4,4}^{-1}$ that have the binary representation of i, for example i=0 corresponds to rows with the last nibble of 0000. Therefore, for each i with i=0, ..., 6 as its last nibble there are $2^4$ rows, and each of these 7 security settings $2^4$ rows r are replaced by the row r' obtained from the original row r by XORing the first nibble of r by $s_i$. The values $s_i$ are tied to specific authorized platforms. Accordingly, at run time the white-box implementation obtains the platform specific value $s_i$ from the platform running the white-box implementation and XORs $s_i$ with the first nibble of the rows corresponding to i=0, ..., 6. Therefore, for messages $M_i$ corresponding to a platform $s_i$, the output from the associated rows will give the proper value, otherwise the output message is not correct. So if a white-box implementation using a security level of 0, ..., 6 is copied to another platform, it will not function properly.

Further, for each i with i=7, ..., 13 as its last nibble there are $2^4$ rows in lookup table $T_{4,4} \circ f_{4,4}^{-1}$, and each of these 7 security settings $2^4$ rows r are replaced by the row r' obtained from original row r by XORing the first nibble of $r_i$ by $H_i$. The values $H_i$ are a hash of the software $S_i$ being used (or a portion thereof). Accordingly, at run time the white-box implementation obtains the hash value H of software $S_i$ and XORs H with the first nibble each of the rows corresponding to i=7, ..., 13. Therefore, for messages $M_i$ corresponding to a software $S_i$ associated with $H_i$, the output from the associated rows will give the proper value, otherwise the message is not correct. So if a white-box implementation using a security level of 7, ..., 13 is modified, it will not function properly.

Further, there are $2^4$ rows in lookup table $T_{4,4} \circ f_{4,4}^{-1}$ with i=14 as its last nibble, and each of these rows are replaced by the row r' obtained from r by changing the first nibble of r into a different 4-bit value. Hence, if these rows are accessed, the white-box implementation gives an incorrect answer. Therefore, for messages $M_i$ corresponding to the white-box implementation associated with a security level equal to 14 the output from the associated rows will give an incorrect value.

Further, there are $2^4$ rows in lookup table $T_{4,4} \circ f_{4,4}^{-1}$ with i=15 as its last nibble, and none of these rows are changed. Hence, if these rows are accessed, the white-box implementation gives a correct answer, i.e., for the white-box implementation when the security setting is 15, all of messages $M_{15}$ are decoded correctly.

Now, for example, checking the integrity of software program $S_3$ may be realized by offering the white-box implementation a message from $M_{10}$, i.e., a message that ends with the nibble defined by the binary representation of 10. The resulting output messages combined with the hash value $H_3$ as described above and provides the proper output.

Another example of the application of the embodiments described above is as follows. Content providers may send messages in different modes. This is implemented by partitioning the message-space in subsets, where each subset is a different mode. The content provider may offer one mode that provides premium content and one mode that provides basic content. Now, when designing a white-box implementation, for each mode it must be chosen how to set the security settings. For the given example, this means for instance that someone who subscribed to the premium content has no security settings for both modes, while someone who is not subscribed has a security setting of access denied for the premium content mode.

It is noted that each user may receive their own specific white-box implementation based upon the security access that the user is entitled to. Further, if a user's authorized security access changes, then they may receive a new white-box implementation based upon the new security settings.

In the described embodiments, the padding data is only 1 nibble of the byte resulting in 16 security levels. Additional levels may be desired. For example, in a cable television system a full byte may be used for the padding giving 256 different sets of $M_i$ where each channel pads its messages with a byte equal to i. Each user may then subscribe to a unique set of channels. The white-box implementation for that user for decoding the encoded channels would provide correct decoding for each message for a subscribed channel and would provide an incorrect decoding for each message for an unsubscribed channel.

In the described embodiments, the difference in behavior for the different sets $M_i$ is only in a single output byte, where 1 nibble of the byte contains padding data. In practice, a larger effect may be desired. Accordingly, the embodiments described may be extended to have larger effects on the behavior. For example, other bytes of the output message may be changed as well so that the incorrect output varies greatly from the correct output.

In various embodiments a system identifier may be used to determine the identity of the white-box implementation or the white-box system running the white-box implementation. A few examples were given above of system identifiers, such as a hash function of a code fragment in the white-box system or a hardware identifier of the system. The system identifier may be derived in other ways as well. For example, the system identifier may be a specific code fragment or table entry.

Further, various examples of tamper resistance were referred to above. Various tamper resistance methods exist and are compatible with the embodiments described herein. For example, a lookup table is defined as a piece of software code. Hence, the lookup table has a dual interpretation: it is both software and lookup table. This makes the code tamper resistant: changing the code implies changing the functionality of the white-box implementation.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

In addition to the computer program being implemented on a non-transitory computer readable medium, such computer program may be transmitted to a user or user device for installation and use. This may be done over any communication network, for example, the internet.

Further, user devices implementing the embodiments described herein may include, smart cards, payment cards, transit cards, access cards and devices, mobile phones, tablets, personal digital assistants, portable and desktop computers, set-top boxes, digital video records, media streaming devices, etc. Uses of the embodiments described above may include payment software, security access, parking access, transit access and payments, banking, software and digital media transmission, secure communications, content distribution, etc.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Figure 5:
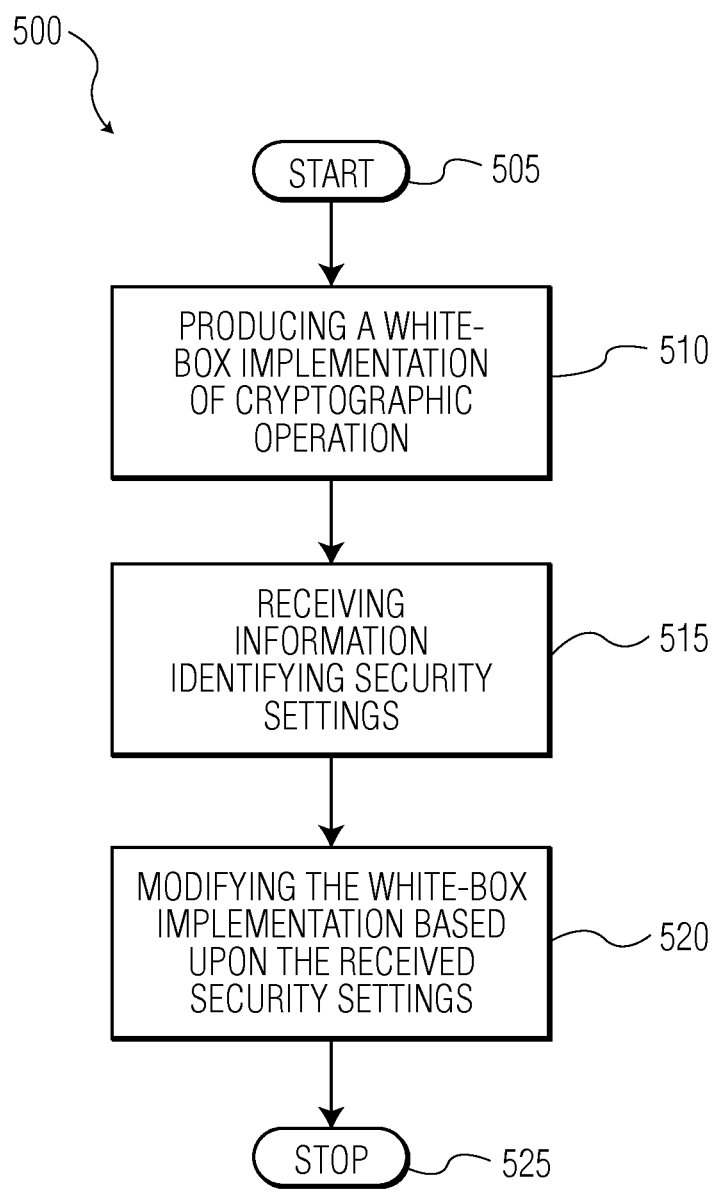
FIG. 5 is a flow chart illustrating a method of implementing a white-box implementation with use-dependent security settings.

FIG. 5 is a flow chart illustrating a method of implementing a white-box implementation with use-dependent security settings. First, the method begins 505. Then, a white-box implementation of the cryptographic operation is produced 510. This may be produced as described above using various methods and implementations. Next, information identifying the security settings to be applied by the white-box implementation may be received 515. Each identified security setting may have an associated set of input messages wherein the sets of input messages do not overlap. In some embodiments, each message in a set of input messages includes the value of the associated security setting. Then, the white-box implementation may be modified based upon the received information identifying the security settings 520 so that: when a received input message is associated with one of the received security settings, the white-box implementation outputs a correct output message associated with the received input message; and when a received input message is not associated with one of the received security settings, the white-box implementation outputs an incorrect output message associated with the received input message. The method may then end 525.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a cryptographic system for enforcing security settings, the non-transitory machine-readable storage medium comprising:
   instructions for receiving, by the cryptographic system, a first input message associated with a first security setting of a plurality of security settings;
   instructions for performing, by the cryptographic system, a keyed cryptographic operation mapping the first input message into a first output message, wherein the keyed cryptographic operation produces a correct output message when the cryptographic system is authorized for the first security setting,
   wherein each of the plurality of security settings has an associated set of input messages wherein the sets of input messages do not overlap,
   wherein an input message space includes all potential input messages to the keyed cryptographic operation and the plurality of input message groups includes all of the input messages in the input message space.

2. The non-transitory machine-readable storage medium of claim 1, wherein each message in a set of input messages includes the value of the associated security setting.

3. The non-transitory machine-readable storage medium of claim 1, further comprising:
   instructions for determining a system identifier for the cryptographic system; and
   instructions for combining the system identifier with the first output message, wherein when the cryptographic system is authorized to perform the keyed cryptographic function, the correct output message is produced.

4. The non-transitory machine-readable storage medium of claim 3, wherein combining the system identifier with the first output message includes XORing system identifier with a portion of the output message.

5. The non-transitory machine-readable storage medium of claim 3, wherein in the system identifier is a hardware identifier of the cryptographic system.

6. The non-transitory machine-readable storage medium of claim 3, wherein in the system identifier is a software identifier of software on cryptographic system.

7. The non-transitory machine-readable storage medium of claim 1, further comprising:
   instructions for receiving a second input message with second security setting; and
   instructions for performing, by the cryptographic system, a keyed cryptographic operation mapping the second input message into a second output message, wherein the keyed cryptographic operation produces a correct output message when the cryptographic system is authorized for the second security setting.

8. The non-transitory machine-readable storage medium of claim 1, further comprising:
   instructions for receiving a second input message with second security setting; and
   instructions for performing, by the cryptographic system, a keyed cryptographic operation mapping the second input message into a second output message, wherein the keyed cryptographic operation produces an incorrect output message when the cryptographic system is not authorized for the second security setting.

9. The non-transitory machine-readable storage medium of claim 1, wherein the cryptographic system includes a network of lookup tables.

10. The non-transitory machine-readable storage medium of claim 9, further comprising:
    instructions for determining a system identifier for the cryptographic system; and
    instructions for accessing a missing entry in one lookup table in the network of lookup tables and outputting a value from the lookup table dependent on the system identifier wherein when the cryptographic system is authorized to perform the keyed cryptographic function, the correct output message is produced.

11. The non-transitory machine-readable storage medium of claim 9, further comprising:
    instructions for determining a system identifier for the cryptographic system; and
    instructions for producing the correct output message when the correct system identifier has been received.

12. The non-transitory machine-readable storage medium of claim 1, wherein the cryptographic system includes a network of finite state machines.

13. The non-transitory machine-readable storage medium of claim 1, wherein the cryptographic operation is one of advanced encryption system (AES) or data encryption standard (DES).

14. A method of producing a cryptographic implementation of a cryptographic operation mapping an input message to an output message, wherein the cryptographic implementation enforces security settings, comprising:
    producing a cryptographic implementation of the cryptographic operation;
    receiving information identifying the security settings to be applied by the cryptographic implementation, wherein each identified security setting has an associated set of input messages wherein the sets of input messages do not overlap;
    modifying the cryptographic implementation based upon the received information identifying the security settings so that:
    when a received input message is associated with one of the received security settings, the cryptographic implementation outputs a correct output message associated with the received input message,
    wherein an input message space includes all potential input messages to the keyed cryptographic operation and the plurality of input message groups includes all of the input messages in the input message space.

15. The method of claim 14, wherein each message in a set of input messages includes the value of the associated security setting.

16. The method of claim 14, wherein when a received input message is not associated with one of the received security settings, the cryptographic implementation outputs an incorrect output message associated with the received input message.

17. The method of claim 14, wherein modifying the cryptographic implementation further comprises:
    determining a system identifier associated a first security setting; and
    modifying a portion of the cryptographic implementation associated with only input messages associated with the first security setting.

18. The method of claim 17, wherein modifying a portion the cryptographic implementation further comprises;
    modifying the output messages of the cryptographic implementation resulting from input messages associated with the first security setting by the system identifier;
    modifying the cryptographic implementation to receive during operation a system identifier of a cryptographic system implementing the cryptographic implementation; and
    modifying the cryptographic implementation to combine during operation the received system identifier with the output message of the cryptographic implementation.

19. The method of claim 18, wherein in the system identifier is a hardware identifier of the cryptographic system.

20. The method of claim 18, wherein in the system identifier is a software identifier of software on cryptographic system.

21. The method of claim 14, wherein the cryptographic implementation includes a network of lookup tables.

22. The method of claim 21, wherein modifying a portion the cryptographic implementation further comprises;
    modifying the cryptographic implementation to receive during operation a system identifier of a cryptographic system implementing the cryptographic implementation;
    modifying a first lookup table of the plurality of lookup tables, by eliminating an entry of the first lookup table;
    modifying the cryptographic implementation to output a value from the first lookup table dependent on the system identifier when an input to the lookup table accesses the eliminated entry in the first table so that when the cryptographic system is authorized to perform the keyed cryptographic function, the correct output message.

23. The method of claim 21, wherein modifying the cryptographic implementation further comprises:
    determining a system identifier associated a first security setting; and
    modifying a portion of a lookup table producing a portion of the output message associated with only input messages associated with the first security setting by XORing the system identifier with a portion of the row of the lookup table producing a portion of the output message;
    modifying the cryptographic implementation to receive during operation a system identifier of a cryptographic system implementing the cryptographic implementation; and
    modifying the cryptographic implementation to combine during operation the received system identifier with the output message of the cryptographic implementation.

24. The method of claim 23, wherein in the system identifier is a hardware identifier of the cryptographic system.

25. The method of claim 23, wherein in the system identifier is a software identifier of software on cryptographic system.

26. The method of claim 14, wherein the cryptographic system includes a network of finite state machines.

27. A method of enforcing security settings in a cryptographic system, comprising:
   receiving, by the cryptographic system, a first input message associated with a first security setting of a plurality of security settings;
   performing, by the cryptographic system, a keyed cryptographic operation mapping the first input message into a first output message, wherein the keyed cryptographic operation produces a correct output message when the cryptographic system is authorized for the first security setting,
   wherein each of the plurality of security settings has an associated set of input messages wherein the sets of input messages do not overlap,
   wherein an input message space includes all potential input messages to the keyed cryptographic operation and the plurality of input message groups includes all of the input messages in the input message space.

28. The method of claim 27, wherein each message in a set of input messages includes the value of the associated security setting.

29. The method of claim 27, further comprising:
   determining a system identifier for the cryptographic system; and
   combining the system identifier with the first output message, wherein when the cryptographic system is authorized to perform the keyed cryptographic function, the correct output message is produced.

30. The method of claim 29, wherein combining the system identifier with the first output message includes XORing system identifier with a portion of the output message.

31. The method of claim 29, wherein in the system identifier is a hardware identifier of the cryptographic system.

32. The method of claim 29, wherein in the system identifier is a software identifier of software on cryptographic system.

33. The method of claim 27, further comprising:
   receiving a second input message with second security setting; and
   performing, by the cryptographic system, a keyed cryptographic operation mapping the second input message into a second output message, wherein the keyed cryptographic operation produces a correct output message when the cryptographic system is authorized for the second security setting.

34. The method of claim 27, further comprising:
   receiving a second input message with second security setting; and
   performing, by the cryptographic system, a keyed cryptographic operation mapping the second input message into a second output message, wherein the keyed cryptographic operation produces an incorrect output message when the cryptographic system is not authorized for the second security setting.

35. The method of claim 27, wherein the cryptographic system includes a network of lookup tables.

36. The method of claim 35, further comprising:
   determining a system identifier for the cryptographic system; and
   accessing a missing entry in one lookup table in the network of lookup tables and outputting a value from the lookup table dependent on the system identifier wherein when the cryptographic system is authorized to perform the keyed cryptographic function, the correct output message is produced.

37. The method of claim 35, further comprising:
   determining a system identifier for the cryptographic system; and
   producing the correct output message when the correct system identifier has been received.

38. The method of claim 27, wherein the cryptographic system includes a network of finite state machines.

39. The method of claim 27, wherein the cryptographic operation is one of advanced encryption system (AES) or data encryption standard (DES).

* * * * *